United States Patent [19]

Anderl

[11] Patent Number: 4,688,474
[45] Date of Patent: Aug. 25, 1987

[54] COFFEE PERCOLATOR

[75] Inventor: Siegfried Anderl, Amstetten, Fed. Rep. of Germany

[73] Assignee: Wuerttembergische Metallwarenfabrik AG, Fed. Rep. of Germany

[21] Appl. No.: 808,425

[22] Filed: Dec. 13, 1985

[51] Int. Cl.⁴ ............................................. A47J 31/00
[52] U.S. Cl. ................................. 99/289 R; 222/236
[58] Field of Search ................. 99/280, 281, 282, 283, 99/289 R, 279, 289 D, 289 P, 290; 222/226, 236, 142; 426/433

[56] References Cited

U.S. PATENT DOCUMENTS

| 2,800,152 | 7/1957 | Sloier | 222/142 X |
| 3,019,946 | 2/1962 | Mueller | 99/289 X |
| 3,055,551 | 9/1962 | Johnson | 222/142 X |
| 3,354,811 | 11/1967 | King | 99/282 |
| 3,446,137 | 5/1969 | Pryor | 99/289 |

FOREIGN PATENT DOCUMENTS

3019365 11/1981 Fed. Rep. of Germany .... 99/289 R
3133778  9/1982 Fed. Rep. of Germany .

Primary Examiner—Robert W. Jenkins
Attorney, Agent, or Firm—Arnold, White & Durkee

[57] ABSTRACT

Described is a coffee percolator comprising a brewing section disposed within a housing and provided with coffee meal filling means. The housing includes a cover plate and at least two coffee meal supply containers projecting through the cover plate to the exterior of the housing and formed with discharge openings positioned above the filling means. Also described is a coffee percolator having at least two coffee meal supply containers projecting upwards through the cover plate, the supply containers each having identically configured sidewalls and a bottom connected to the sidewall by fastener means permitting the bottom to be secured at two different positions in mirror-reflection alignment.

12 Claims, 4 Drawing Figures

COFFEE PERCOLATOR

The present invention relates to a coffee percolator having a coffee meal supply container and a brewing section adapted to have coffee meal supplied thereto from said supply container for brewing a coffee beverage.

BACKGROUND OF THE INVENTION

Hitherto known automatic filter coffee percolators are designed for making only a single type of coffee. If for instance a restaurant or the like offers caffeine-free coffee in addition to normal coffee, one of the two types has to be brewed manually or by the employ of a second percolator. Both these alternatives are uneconomical in that in the first case there is no control possible of the amount of coffee sold, while in the second case the additional coffee percolator is usually not in full-time operation and is thus not in cost-effective operation.

In an instant beverage vending machine of the type described in DE-OS No. 31 33 778 it is already known to provide a plurality of separate supply containers for different base products and to connect these containers via chutes to a dispensing outlet disposed above a receptacle location. In the case of coffee percolators this system has not yet been applied, since the steam escaping during the coffee brewing operation would cause the coffee meal in the chutes to coagulate. In the known beverage vending machine there is thus in fact provided an additional section for brewing coffee in the traditional manner, this device similarly permitting only a single type of coffee to be made.

SUMMARY OF THE INVENTION

It is therefore an object of the invention to provide a coffee percolator for brewing different types of coffee.

It is a further object of the invention to provide a coffee percolator having at least two supply containers, each of which has a sufficient filling volume for automatic operation of the coffee percolator in a restaurant or the like.

It is a still further object of the invention to design a coffee percolator having at least two supply containers in such a manner that uprising steam will not cause the coffee meal to coagulate.

It is a still further object of the invention to provide a coffee percolator having at least two supply containers and capable of being manufactured in a simple and economical manner.

It is another object of the invention to design a coffee percolator having at least two supply containers in such a manner that the customer immediately perceives how many types of coffee are offered.

Further objects of the invention will become evident from the description in connection with the drawings.

BRIEF DESCRIPTION OF THE DRAWINGS

Embodiments of the invention shall now be described in detail by way of example with reference to the accompanying drawings, wherein.

DESCRIPTION OF THE PREFERRED EMBODIMENTS

Figure 1:
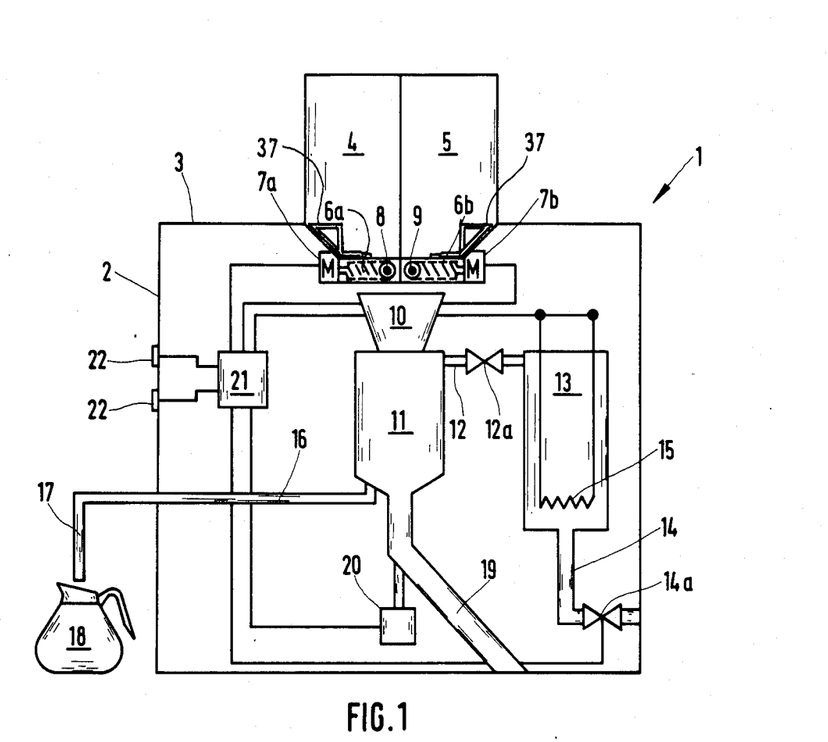
FIG. 1 shows a diagrammatical illustration of a coffee percolator according to the invention.

Diagrammatically shown in FIG. 1 is a coffee percolator 1 having a housing 2 the top of which is closed by a cover plate 3. Two coffee meal supply containers 4 and 5 project through cover plate 3 so as to be readily visible from outside. The filling volume of supply containers 4 and 5 is selected to be sufficient for employ of the percolator in a restaurant or the like. The filling volume of each supply container may thus be substantially equal to the filling volume of a single supply container in a conventional coffee percolator. On the other hand, the filling volume of supply containers 4 and 5 may of course be determined with a view to the type of coffee to be received therein, so that the filling volume of a supply container for a type of coffee which is in greater demand may be greater than the filling volume of the other supply container for a type of coffee which is less frequently demanded.

Disposed in the lower portion of each supply container 4 and 5 is a respective screw conveyor 6a, 6b, both screw conveyors being of identical construction and driven by a respective motor 7a, 7b. Screw conveyor 6a is operable to convey coffee meal from supply container 4 through a discharge opening 8, and screw conveyor 6b conveys coffee meal from supply container 5 through a discharge opening 9, discharge openings 8 and 9 being circumferentially disposed above a funnel-shaped filling means 10 of a brewing section 11. Brewing section 11 may for instance be of the construction described in German Pat. No. 1,454,109. Opening into brewing section 11 from above is a hot water pipe 12 controlled by a control valve 12a for supplying scalding hot water from a water heating container 13 to an upper portion of brewing section 11. Water heating container 13 is connected to a cold water supply pipe 14 provided with a valve 14a, and contains a heater 15.

A conduit for the percolated coffee, designated with reference numeral 16, extends from a lower portion of brewing section 11 to a dispensing outlet 17 outside housing 2 and above a receptacle, in the example shown a coffee-pot 18, placed therebelow. A conduit 19 extends from the lowest point of brewing section 11 for discharging the exhausted coffee-grounds to the exterior of housing 2.

The different operating steps of the coffee percolator, i.e. the supply of coffee meal, the supply of hot water and the discharge of the exhausted coffee-grounds are controlled by a motor 20. Motor 20 itself is controlled by a control unit 21 in response to the manual actuation of selector switches 22 disposed on the exterior of housing 2. The actuation of selector switches 22 permits one of motors 7a or 7b to be selectively energized for conveying coffee meal from the respective supply container 4 or 5 towards filling means 10. Control unit 21 subsequently operates in a sufficiently known manner to control the brewing operation, i.e. the opening and closing of valve 12a, the energization of motor 20 and the actuation of heater 15 and valve 14a.

Figure 2:
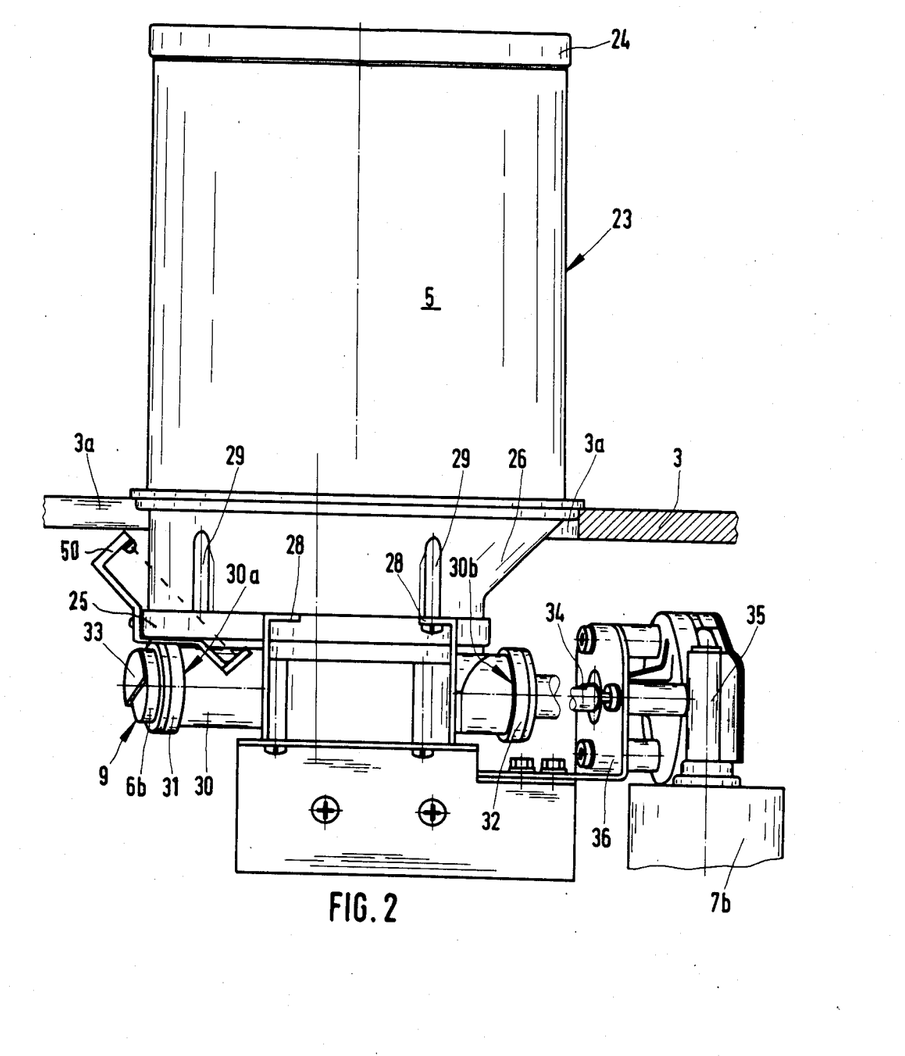
FIG. 2 shows an elevational view of a supply container.

FIG. 2 shows an elevational view of supply container 5 of FIG. 1. Supply container 5 has an upright sidewall 23 projecting from housing 2 through an opening 3a of cover plate 3, and has its top closed by a cover 24 which may be opened for the introduction of coffee meal.

Sidewall 23 comprises four flat sidewall portions enclosing an interior space with a substantially rectangular cross-section, the lower part of which is closed by a round bottom 25 having a smaller cross-sectional area and disposed at an excentric position with respect to the cross-section of sidewall 23. Bottom 25 is releasably connected to an intermediate wall portion 26 having a peripheral flange 27 engaged with cover plate 3 and connected to sidewall 23. Bottom 25 is provided with a plurality of lugs at spaced locations around its periphery for connection with corresponding projections 29 spaced around the periphery of intermediate wall portion 26 and provided with internal screw threads for this purpose. Lugs 28 and projections 29 are arranged in such a manner that bottom 25 may be selectively secured to supply container 5 as shown or to supply container 4 in mirror-reflection alignment as shown in FIG. 3.

Figure 3:
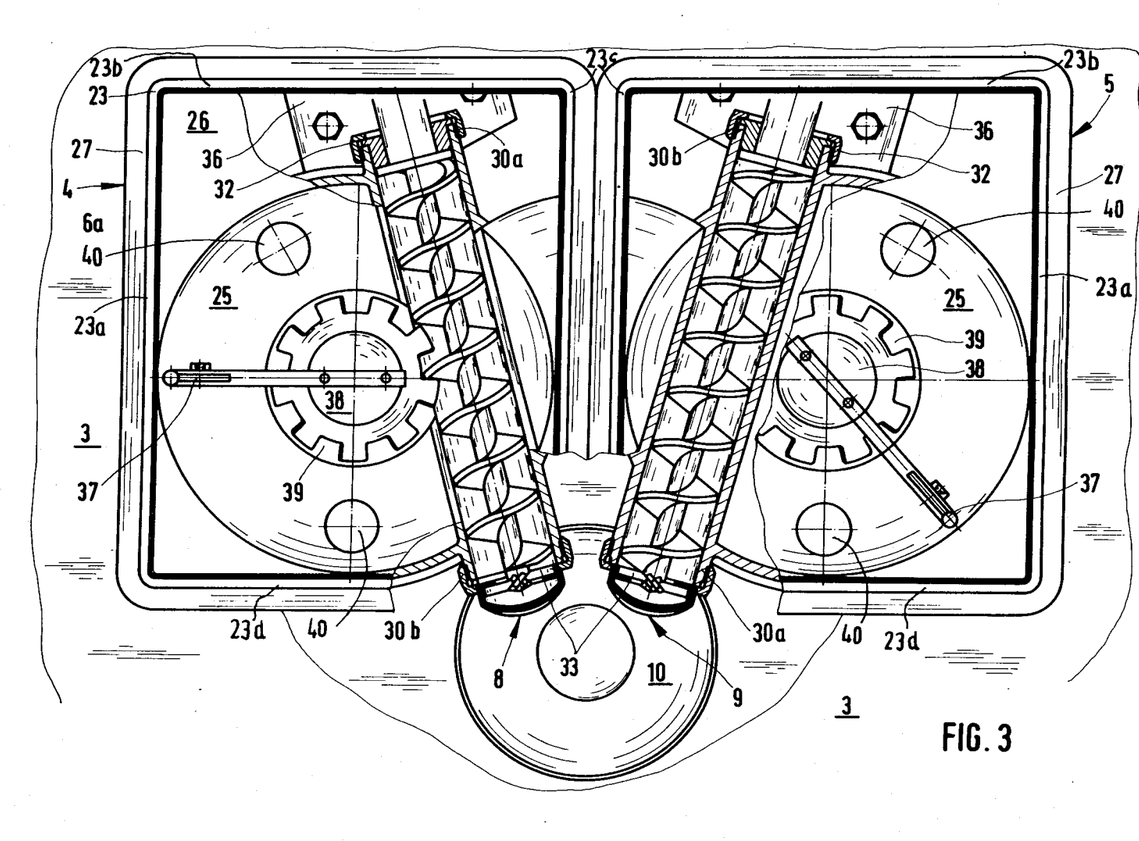
FIG. 3 shows a partially sectioned top plan view of a coffee percolator according to the invention having two supply containers.

As shown in FIGS. 2 and 3, the lower face of bottom 25 is provided with an elongate screw conveyor housing 30 formed with discharge opening 9 and configured to have screw conveyor 6b mounted therein. Screw conveyor housing 30 and bottom 25 are preferably formed as an integral cast member. Screw conveyor housing 30 has an internal cavity the cross-sectional shape of which corresponds to the diameter of screw conveyor 6b, and communicates with the interior of the respective supply container 4 or 5 in a manner to be described. The two ends 30a and 30b of screw conveyor housing 30 project a short distance over the periphery of bottom 25 and are each provided with external threads for threaded engagement with a threaded closure cap 31 and 32, respectively. Closure cap 31 of end portion 30a contains discharge opening 9, a bearing for the front end of the screw conveyor and a control element 33 located at the front end of the screw conveyor at the exterior of closure cap 31 and described in detail in U.S. patent application Ser. No. 726,998, the disclosure of which is included herein by reference. The rear closure cap 32 on end portion 30b contains a bearing for a rear portion of the screw conveyor shaft coupled to motor 7b in a conventional manner through a connecting shaft 34 and a transmission 35. Motor 7b is threadedly secured to an angular bracket 36 together with transmission 35 and connecting shaft 34. Angular bracket 36 is fixedly secured to an angular metal support 36a itself fixedly secured to housing 2 by means of screws 36b. Angular metal support 36a carries the total assembly of supply container 5, screws 36b serving for adjustment purposes.

Shown in FIG. 3 is a top plan view of the coffee percolator of FIG. 1, with the covers removed and some of the parts cut away for better understanding. As evident from this figure, upright sidewalls 23 of supply containers 4 and 5 are of identical configuration, so that both supply containers have the same filling volume. Each sidewall 23 comprises two short and two long flat sidewall portions 23a, 23b, 23c and 23d enclosing a rectangular cross-sectional area. As also evident from this figure, intermediate wall portions 26 and round bottom 25 including screw conveyor housing 30 are likewise of identical configuration for both supply containers 4 and 5. The bottom 25 of each supply container 4 and 5 is so dimensioned and disposed with respect to vertical sidewall 23, that intermediate wall portion 26 extends in linear alignment with upright sidewall 23 at three locations thereof. Bottom 25 is of a diameter corresponding to the width of shorter sidewall portions 23b, 23d, and is located at an excentric position with respect to the rectangular cross-section circumscribed by sidewall 23 in peripheral alignment with one of the shorter sidewall portions 23d. Supply containers 4 and 5 are disposed closely adjacent one another, with longer sidewall portion 23c of supply container 4 facing longer sidewall portion 23c of supply container 5. In the example shown, sidewall portions 23c are in contact with one another, they may also, however, be spaced from one another. Thus, sidewall portion 23c in each supply container is the sidewall portion nearest to the other supply container. Bottom 25 with screw conveyor housing 30 of supply container 4 is disposed in mirror-reflection alignment with respect to bottom 25 of supply container 5 and secured in position by the threaded connection of lugs 28 to selected projections 29. It is further noted that bottoms 25 of supply containers 4 and 5 are so disposed with respect to upright sidewalls 23 that discharge openings 8 and 9 are located as closely as possible to the adjacent flat sidewall portions 23c of supply containers 4 and 5 immediately above filling funnel 10. In this arrangement, threaded closure cap 31 is secured to end portion 30b of screw conveyor housing 30 of supply container 5, while end portion 30a carries the rear threaded closure cap 32. The described arrangement permits the two supply containers 4 and 5 to be located on cover plate 3 as closely to one another as possible, with their discharge openings 8 and 9 still above filling funnel 10. On the other hand, this arrangement permits all of the parts employed for supply containers 4 and 5 to be of identical construction, so that only a single mould is required for instance for casting bottom 25 with its screw conveyor housing 30 or for forming sidewall 23 and intermediate wall portion 26, respectively. It is only during assembly that a supply container 4 or supply container 5 may be formed by suitably assembling the components in mirror-image-wise arrangement, the lugs 28 and projections 29 being suitably arranged to ensure that the discharge openings of all supply containers employed will be disposed above filling funnel 10. In the embodiment shown by way of example in FIG. 2, bottom 25 is provided with two lugs 28 at offset positions relative to one another for cooperation with a respective projection 29 on intermediate wall portion 26. In correspondence to each of the projections 29 shown, intermediate wall portion 26 is provided with a second projection (not shown) at an angularly offset position corresponding to the required angle of rotation of bottom 25 about the center axis of bottom 25 for assembly in mirror-reflection alignment. The bottom 25 for supply container 4 is thus secured to the projections 29 shown, while the bottom 25 for supply container 5 is secured to the not shown projections. In the embodiment shown, the angle of rotation of bottom 25 between its positions in supply containers 4 and 5 is about 150°. In accordance therewith, the offset angle between one of the shown projections 29 and the corresponding not shown projection is likewise about 150°. The number of projections and lugs for securing the bottom in a given alignment is dictated by structural requirements. It is thus possible to provide only one projection and one lug or a greater number of projections and lugs instead of the two projections and lugs shown. The angle of rotation for the mirror-reflection alignment of bottom 25 is determined by the positioning of the axis of screw conveyor housing 30, i.e. by its distance from the center axis of bottom 25 and its angular offset with respect to sidewall portions 23a and 23c, respectively, and may be in the range between 90° and 180°.

Each supply container 4 and 5 is provided with a wiper arm 37. A wiper arm of this type is described in co-pending U.S. patent application Ser. No. 808,534 filed on the same date as the present application, so that its specific construction need not be discussed in detail. Wiper arm 37 is bent to an angular shape, its horizontal portion being threadedly secured to a gear 38 in drive-transmitting engagement with screw conveyor 6a or 6b, respectively. Gear 38 is mounted for rotation in a recess 39 formed integrally with bottom 25 at a center position thereof. Recess 39 intersects screw conveyor housing 30, so that the teeth of gear 38 can project between the convolutions of screw conveyor 6a or 6b, respectively, to be entrained thereby on rotation of the respective screw conveyor. This causes wiper arm 37 to be moved over bottom 25 for sweeping the coffee meal in the respective supply container towards screw conveyor 6a or 6b, respectively.

Provided in the bottom of each supply container 4 and 5 are two optically transparent portions 40, in correspondence to which an adjacent area of intermediate wall portion 26 is formed with similar optically transparent portions (not shown). Transparent portions 40 are part of a filling level measuring device including an electro-optical sensor 50 the optical axis of which extends through corresponding transparent portions of bottom 25 and intermediate wall portion 26 across the corner formed between bottom 25 and intermediate wall portion 26 for generating a signal when there is no longer any coffee meal in the supply container. This filling level measuring device is described in detail in co-pending U.S. patent application Ser. No. 808,534 filed on the same date as the present application, to which reference is hereby made. The two transparent portions 40 of bottom 25 (and at the same time of course also the transparent portions of intermediate wall portion 26) are likewise disposed at an offset angle of about 150° relative to one another, permitting the electro-optical sensor 50 to be mounted adjacent the driven end of screw conveyor 6a or 6b of both supply containers 4 and 5. Any other mounting position is of course also possible in accordance with the provisions of any specific design.

Gear 38 requires screw conveyor housing 30 to be aligned along a secant of bottom 25. In the case of supply containers which do not require a wiper arm, it is of course also possible for the screw conveyor housing to extend in a diagonal direction of upright sidewall 23 across the center of bottom 25 It is of course likewise possible for the screw conveyor housing to extend substantially tangentially with respect to bottom 25 and/or parallel to one of the flat sidewall portions extending in the direction towards filling funnel 10.

Figure 4:
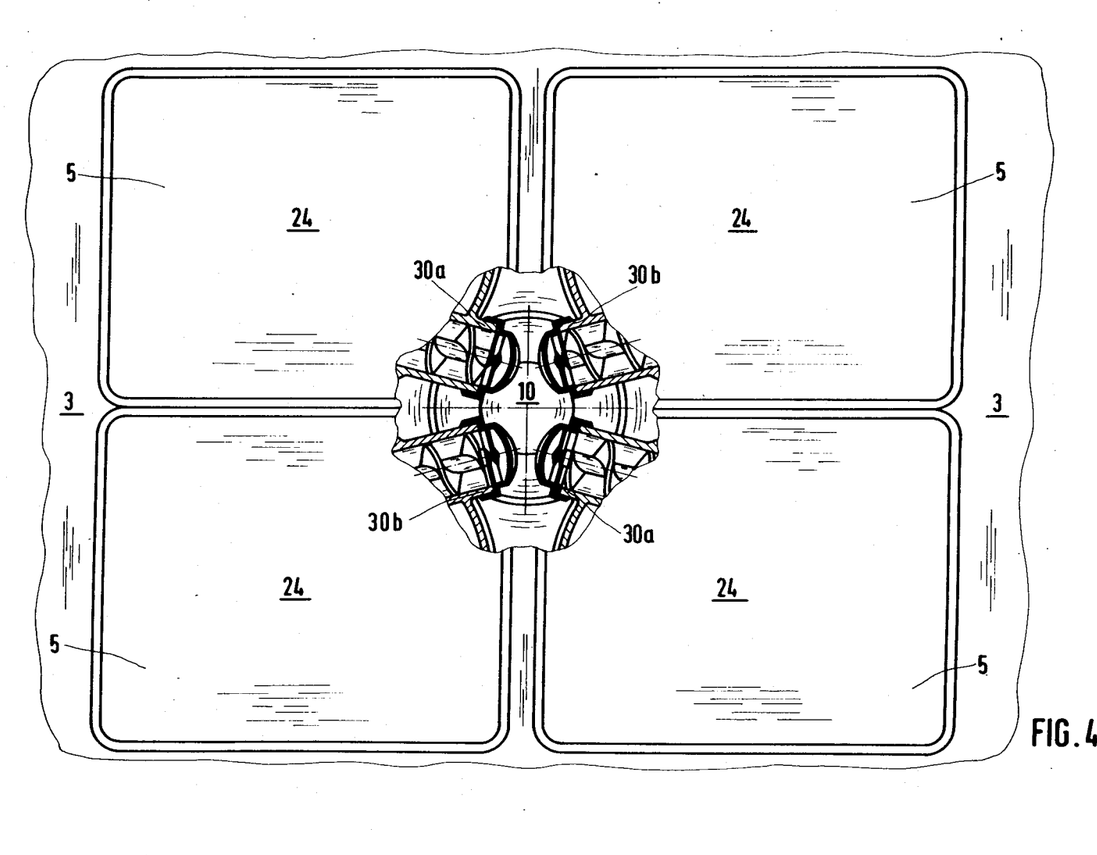
FIG. 4 shows a partially sectioned top plan view of a coffee percolator according to the invention having four supply containers.

FIG. 4 shows an arrangement of four supply containers 4, 5 and 4′, 5′ each closed by a coevr 24. Supply containers 4 and 5 have already been described in detail with reference to FIGS. 2 and 3, corresponding parts being designated by the same reference numerals. The construction of supply container 4′ including the arrangement of bottom 25 with respect to sidewall portion 23d is identical to that of supply container 4. The same applies to supply container 5′, the construction and arrangement of which correspond to those of supply container 5 in all details. Supply containers 4′ and 5′ are aligned relative to one another in the same manner as supply containers 4 and 5, i.e. with their longer sidewall portions 23c facing each other. The four supply containers are grouped around filling funnel 10 in such a manner that supply container 4′ is located diagonally opposite supply container 4, and supply container 5′ is disposed diagonally opposite supply container 5. Supply containers 4′ and 5 and supply containers 4 and 5′, respectively, thus abut one another with their respective short sidewall portions 23d facing towards filling funnel 10.

As readily recognized from the drawing, the described construction and arrangement permits the individual supply containers to be of a size corresponding to that of a single supply container in a conventional coffee percolator. To this purpose the entire surface area of cover 3 is available for positioning the supply containers. The supply containers may of course also be of different sizes for containing different types of coffee which may be in greater or smaller demand. The cross-sectional configuration of the sidewalls may also be square, round or any other shape, and the sidewalls may be integrally connected to the bottom. Further modifications within the scope of the following claims will be readily obvious to the skilled artisan.

We claim:

1. A coffee percolator comprising a housing provided with a cover plate, a brewing section disposed in said housing and having filling means opening towards said cover plate, and at least two coffee meal supply containers projecting upwards through said cover plate, each supply container containing a screw conveyor mounted in a screw conveyor housing for conveying coffee meal from said supply container through a discharge opening provided in said screw conveyor housing into said filling means, said at least two supply container being disposed closely adjacent one another in such a manner that said discharge openings of said at least two adjacent supply containers open into said filling means in a side-by-side arrangement with said screw conveyor housings of said at least two supply containers being angularly disposed in a mirror reflection arrangement.

2. A coffee percolator comprising a housing provided with a cover plate, a brewing section disposed in said housing and provided with a filling means opening towards said cover plate, and at least two coffee meal supply containers projecting upwards through said cover plate, each supply container having a wall including two flat sidewall portions meeting at a sidewall junction, and a coffee meal discharge opening located adjacent said sidewall junction, a screw conveyor being provided for conveying coffee meal from said supply container through said discharge opening and into said filling means, said at least two supply containers being positioned with one of their flat sidewall portions in closely facing relationship.

3. A coffee percolator comprising a housing provided with a cover plate, a brewing section disposed in said housing and having filling means opening towards said cover plate, and at least two coffee meal supply containers projecting upwards through said cover plate, each supply container having two short and two long flat sidewall portions enclosing a rectangular cross-sectional area therebetween having a center axis, each supply container having a round bottom centered about a center axis and having a diameter substantially corresponding to the width of said short sidewall portion, said center axis of said bottom being spaced from said center axis of said rectangular cross-sectional area, said bottom being positioned adjacent a first short sidewall portion, a coffee meal discharge opening being provided adjacent the corner between said first short sidewall portion and a first long sidewall portion, a screw conveyor being provided for conveying coffee meal from said supply container through said discharge opening and into said filling means, said at least two supply containers being positioned with their first long sidewall portions in closely facing relation- ship.

4. A coffee percolator comprising a housing provided with a cover plate, a brewing section disposed in said housing and having filling means opening towards said cover plate, and at least two coffee meal supply containers projecting upwards through said cover plate, each supply container having a sidewall and a bottom, a screw conveyor housing being connected to said bottom and having a first and a second open end, a screw conveyor being adapted to be selectively mounted in said screw conveyor housing from one or the other of said open ends thereof, one of said open ends being selectively formed as a coffee meal discharge opening, said bottom being connected to said sidewall by fastener means permitting said bottom to be positioned at at least two different positions in mirror-reflection offset relationship to one another, said at least two supply containers being positioned closely adjacent one another, said discharge openings of said at least two supply containers opening closely adjacent one another into said filling means.

5. A coffee percolator according to claim 4, wherein said sidewall of each supply container comprises two short and two long flat sidewall portions enclosing a rectangular cross-sectional area having a center axis, each supply container having a round bottom centered about a center axis, the diameter of said round bottom generally corresponding to the width of a short sidewall portion, the center axis of said bottom being spaced from said center axis of said rectangular cross-sectional area, said bottom being disposed adjacent a first short sidewall portion, said coffee meal discharge opening being located adjacent a corner between said first short sidewall portion and a first long sidewall portion, at least two supply containers being positioned with their first long sidewall portions closely adjacent one another.

6. A coffee percolator comprising a housing provided with a cover plate, a brewing section disposed in said housing and having a filling means opening towards said cover plate, and at least two coffee meal supply containers projecting upwards through said cover plate, each said container comprising a sidewall and a bottom, said bottom being connected to said sidewall by fastener means permitting said bottom to be positioned at at least two different positions angularly offset from one another in mirror-reflection alignment, a screw conveyor housing being connected to said bottom and having a first and a second open end portion, a screw conveyor being adapted to be selectively mounted in said screw conveyor housing from one or the other of said open end portions thereof, one of said open end portions being selectively configured as a coffee meal discharge opening, said at least two supply containers being positioned closely adjacent one another, said discharge openings of said at least two supply containers opening into said filling means closely adjacent one another.

7. A coffee percolator comprising a housing provided with a cover plate, a brewing section disposed in said housing and having filling means opening towards said cover plate, and at least two coffee meal supply containers projecting upwards through said cover plate, each container having a sidewall and a bottom, said bottom being connected to said sidewall be fastener means permitting said bottom to be positioned at at least two different positions offset from one another in mirror-image-wise arrangement by a rotational angle, a screw conveyor housing being connected to said bottom and having a first and a second open end portion, a screw conveyor being adapted to be selectively mounted in said screw conveyor housing from one or the other open end portion thereof, one of said open end portions being selectively configured as a coffee meal discharge opening, two pairs of optically transparent portions being provided for positioning a filling level measuring device comprising an electro-optical sensor, one optically transparent portion of each pair being located in said bottom, while the other optically transparent portion of each pair is located in said sidewall, said pairs of optically transparent portions enclosing said rotational angle therebetween, said at least two supply containers being positioned closely adjacent one another, said discharge openings of said at least two supply containers opening into said filling means closely adjacent one another.

8. A coffee percolator according to claim 7, wherein a gear is provided to be driven by the rotation of said screw conveyor, wiper means being connected to said gear to move over said optically transparent portions on rotation of said gear, whereby said optically transparent portions are cleared of coffee meal adhering thereto.

9. A coffee percolator according to one of claims 1, 2, 4, 6 or 7, wherein there are provided four coffee meal supply containers projecting upwards through said cover plate.

10. A coffee percolator comprising a housing provided with a cover plate, a brewing section disposed in said housing and having filling means opening towards said cover plate, and four coffee meal containers projecting upwards through said cover plate, each supply container having a wall including a first and a second short sidewall portion and a first and a second long sidewall portion, and a round bottom having a center axis, said sidewall portions being arranged about a center axis and enclosing a rectangular cross-sectional area therebetween, said first long sidewall portion and said first short sidewall portion forming a corner, the diameter of said bottom corresponding to the length of said first short sidewall portion, said center axis of said bottom being spaced from said center axis of said sidewall portions, so that said bottom is located adjacent said first short sidewall portion, a coffee meal discharge opening being located adjacent said corner, each of said four containers being positioned with its first short sidewall portion abutting a short sidewall portion of an adjacent supply container and its first long sidewall portion abutting a long sidewall portion of the other adjacent supply container, each bottom being connected to the respective sidewall by fastener means permitting said bottom to be positioned at at least two different positions offset from one another in a mirror-imagewise arrangement by a rotational angle, so that the bottom of each supply containers is positioned in mirror-reflection alignment with respect to the bottoms of the two adjacent supply containers, each bottom comprising a screw conveyor housing having a first and a second open end portion for mounting a screw conveyor therein selectively from one or the other of said open end portions, a selective one of said first and second open end portions forming said discharge opening.

11. A coffee percolator according to claim 10, wherein each supply container comprises two optically transparent portions for an electro-optical sensor, one optically transparent portion of each pair being provided in said bottom, the other optically transparent portion being provided in said sidewall, said pairs of optically transparent portions enclosing said rotational angle therebetween.

12. A coffee percolator according to claim 11, wherein each supply container includes a gear to be driven by the rotation of said screw conveyor, wiper means being connected to said gear for moving over said optically transparent portions on rotation of said gear to thereby clean said optically transparent portions of coffee meal adhering thereto.

* * * * *

UNITED STATES PATENT AND TRADEMARK OFFICE
CERTIFICATE OF CORRECTION

PATENT NO. : 4,688,474
DATED : August 25, 1987
INVENTOR(S) : S. Anderl

It is certified that error appears in the above-identified patent and that said Letters Patent are hereby corrected as shown below:

In column 5, line 57 change "coeyr" to --cover--.

In column 7, line 8, change "relation-ship" to --relationship--.

Signed and Sealed this

Twenty-second Day of March, 1988

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,688,474

DATED : August 25, 1987

INVENTOR(S) : S. Anderl

It is certified that error appears in the above-identified patent and that said Letters Patent is hereby corrected as shown below:

In column 8, line 3, change "be" to --by--.

Signed and Sealed this

Twenty-third Day of August, 1988

*Attest:*

DONALD J. QUIGG

*Attesting Officer*   *Commissioner of Patents and Trademarks*